United States Patent
Karyadi et al.

(10) Patent No.: US 9,322,494 B2
(45) Date of Patent: Apr. 26, 2016

(54) PIPELINE UNIT

(71) Applicant: Heerema Marine Contractors Nederland SE, Leiden (NL)

(72) Inventors: Erwan Karyadi, Leiden (NL); Helen Rose Boyd, Leiden (NL); Thomas Balder, Leiden (NL); Simone Van Rosendaal, Leiden (NL)

(73) Assignee: HEEREMA MARINE CONTRACTORS NEDERLAND SE, Leiden (NL)

( * ) Notice: Subject to any disclaimer, the term of this patent is extended or adjusted under 35 U.S.C. 154(b) by 0 days.

(21) Appl. No.: 14/354,503

(22) PCT Filed: Oct. 31, 2012

(86) PCT No.: PCT/NL2012/050755
§ 371 (c)(1),
(2) Date: Apr. 25, 2014

(87) PCT Pub. No.: WO2013/066169
PCT Pub. Date: May 10, 2013

(65) Prior Publication Data
US 2014/0290033 A1 Oct. 2, 2014

Related U.S. Application Data

(60) Provisional application No. 61/553,493, filed on Oct. 31, 2011.

(30) Foreign Application Priority Data

Nov. 1, 2011 (NL) .................................. 2007692

(51) Int. Cl.
*F16L 9/14* (2006.01)
*F16L 58/18* (2006.01)
(Continued)

(52) U.S. Cl.
CPC ............... *F16L 9/14* (2013.01); *F16L 13/0272* (2013.01); *F16L 58/181* (2013.01); *F16L 59/20* (2013.01); *Y10T 29/49826* (2015.01)

(58) Field of Classification Search
USPC .................................................... 138/145, 146
See application file for complete search history.

(56) References Cited

U.S. PATENT DOCUMENTS 3,711,124 A * 1/1973 Gerholt ................. F16L 59/028
285/351
3,744,823 A * 7/1973 Muir et al. .................... 285/21.1
(Continued)

FOREIGN PATENT DOCUMENTS

WO 2007121234 10/2007
WO 2009027686 3/2009

OTHER PUBLICATIONS

Search Report and Written Opinion dated Jan. 2, 2013 for International Application No. PCT/NL2012/050755.

(Continued)

Primary Examiner — Paul R Durand
Assistant Examiner — Vishal Pancholi
(74) Attorney, Agent, or Firm — Patterson & Sheridan, L.L.P.

(57) ABSTRACT

A pipeline unit (1) comprising a pipe member (2) and a pipe coating (3) surrounding the pipe member (2), which pipe member comprises a pipe end (4), and which pipe coating (3) extends along a length of the pipe member and ends at a coating end face located at a distance from the pipe end, wherein a bonding member (8) is provided on the coating end face, which bonding member (8) is attached to the coating end face and made from a material which is different from the material of which the pipe coating (3) is made.

14 Claims, 10 Drawing Sheets

Figure 1:
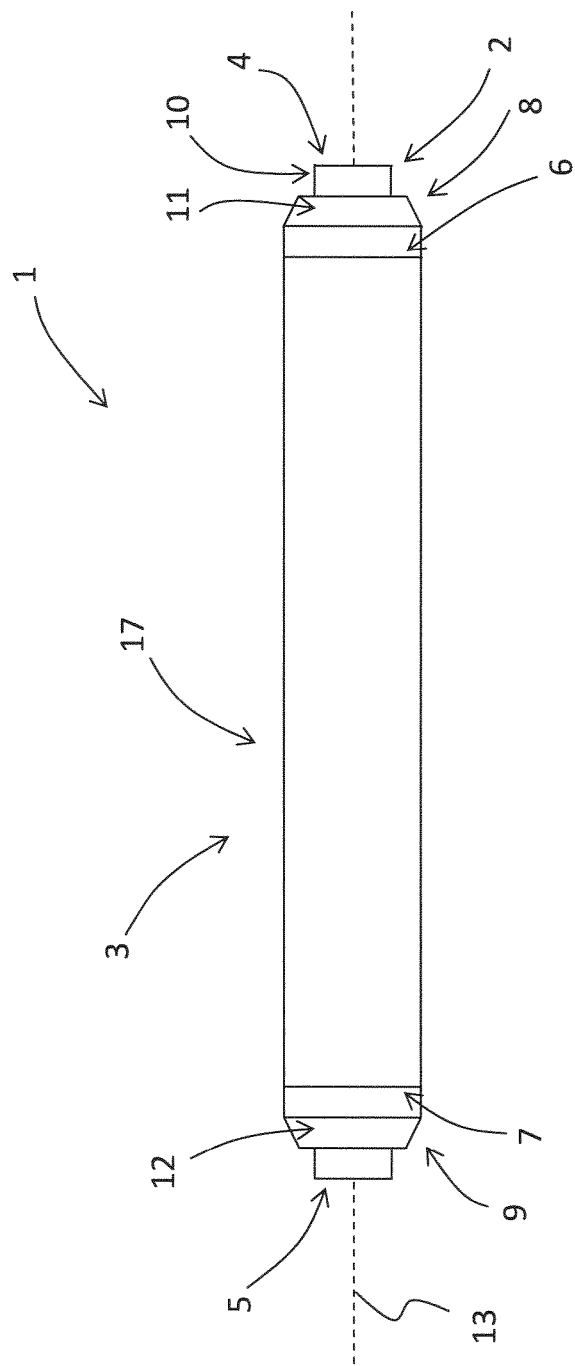

(51) Int. Cl.
  *F16L 59/20* (2006.01)
  *F16L 13/02* (2006.01)

(56) References Cited

U.S. PATENT DOCUMENTS

| | | | | |
|---|---|---|---|---|
| 4,019,761 A | * | 4/1977 | Heidemann | 285/47 |
| 4,660,861 A | * | 4/1987 | Argy | F16L 59/029 138/149 |
| 4,732,412 A | * | 3/1988 | van der Linden et al. | 285/47 |
| 4,746,147 A | * | 5/1988 | Walker | F16L 59/182 285/374 |
| 5,104,152 A | * | 4/1992 | Galfant | 285/47 |
| 5,662,974 A | | 9/1997 | Andrenacci et al. | |
| 6,065,781 A | | 5/2000 | Titus | |
| 2007/0240780 A1 | * | 10/2007 | Nestegard et al. | 138/145 |
| 2010/0084037 A1 | * | 4/2010 | Ericsson et al. | 138/137 |
| 2010/0154917 A1 | * | 6/2010 | Batallas et al. | 138/141 |

OTHER PUBLICATIONS

Search Report and Written Opinion dated May 18, 2012 for Netherland Application No. NL2007692.

* cited by examiner

PIPELINE UNIT

This application is the National Stage of International Application No. PCT/NL2012/050755, filed Oct. 31, 2012, which claims benefit of Netherlands Patent Application No. 2007692, filed Nov. 1, 2011, and which claims benefit of U.S. Provisional Application No. 61/553,493, filed Oct. 31, 2011.

FIELD OF THE INVENTION

The present invention relates to a pipeline unit, an assembly of two pipeline units and a method of producing an assembly of two pipeline units.

DISCUSSION OF THE PRIOR ART

Pipelines are used in the oil and gas industry for the transportation of hydrocarbons. When hydrocarbon deposits are found under the sea floor, pipelines are often laid on the sea floor for transporting the hydrocarbons to a storage or production facility.

Pipelines are typically formed from many pipeline units that are welded end-to-end before they are laid. Pipeline units comprise a pipe member which are often manufactured from carbon steel and are prone to corrosion if they are not protected from the sea water. The pipe members are therefore coated with protective material, the type may be determined by the operating environment. Polyolefins, such as polypropylene (PP), are widely used as a coating material. Also other materials are used.

The outer pipe surface of the pipe member may first be provided with a layer of an anti corrosion agent such as an epoxy, that is applied either in liquid or powdered form. Fusion Bonded Epoxy (FBE) is widely used. Subsequently, the pipe coating made from for example a polyolefin material is provided on the anti corrosion layer. An adhesion promoter may be applied on top of the FBE to enhance bonding to the material of the pipe coating.

The pipe coating may be build up with layers of polyolefin material. For example, a first layer of polypropylene is applied over the anti corrosion layer and the adhesion promoter. A second thin layer of polypropylene is applied on top, with a third layer of thicker, extruded polypropylene over the second layer. Two additional layers of polypropylene may for example be applied. When insulation is needed, further modified layers can be added, with a final layer of hardened polypropylene to protect the insulation as well as the pipe member.

The pipe ends of the pipe members are not covered by the pipe coating. The pipe coating extends along a length of the pipe member and ends at a first coating end face located at a distance from the first pipe end and at a second coating end face located at a distance from the second pipe end.

To produce a pipeline, the pipe ends of the pipeline units are joined together, for example by welding. Other joining techniques may be used. The pipeline units are jointed together at a pipe joint, such that the coating end faces of the pipeline units are located at opposite sides of the pipe joint.

After the joining of the pipeline units, the pipe ends and the pipe joint are covered by a joint coating. As the pipeline units are joined together in the field before they are laid on the seabed or reeled onto a reel for transport to a laying vessel, the coating of the pipe joints is performed in the field as well. This means that said operations may take place outdoors, such as on a quay or off-shore, for example on a pipeline laying vessel.

A common technique used for the production of the joint coating is injection moulding, such as Injection Moulded Polypropylene (IMPP), and Injection Moulded Polyurethane (IMPU). The opposite coating end faces of the two joined pipeline units are usually heated, and the pipe joint is enclosed with a mould that defines a cavity between the uncoated pipe ends and the pipe joint, the two opposite coating end faces of the pipeline units and the mould. Molten polypropylene (IMPP) or pre-set polyurethane (IMPU) is then injected into the cavity where it cools and solidifies. A layer of an anti corrosion agent may be provided on the uncoated pipe ends and the pipe joint before the joint coating is applied.

A disadvantage of the use of polypropylene for the joint coating is that the process is time consuming, labour intensive and expensive. A relatively long time is required for the polyolefin pipe coating to sufficiently bond to the injection moulded polypropylene and before it is deemed strong enough to accommodate bending without separating and exposing the outer pipe surface. It is very important to secure an impermeable bond between the pipe coating and the joint coating to properly protect the pipe member during use.

Another disadvantage with IMPP relates to the need to heat the coating end faces of the polyolefin pipe coating prior to fitting the mould over the pipe joint and injecting the molten polypropylene. Heating the coating end faces sufficiently requires a difficult and time consuming operation.

A disadvantage of IMPU is that it is very difficult to obtain a secure bonding with for example a polyolefin material of the pipe coating. The bonding which can be obtained in the field is not strong enough to provide a securely bonded joint coating. When the bonding is not secure, water may reach the pipe member. Pipelines often transport hydrocarbons at elevated temperatures, the outer pipe surface of pipe member will therefore also be at elevated temperatures. Hydrolysis can occur in polyurethane at the interface known as the 'hot-wet interface' when the water comes into contact with the polyurethane which is at an elevated temperature due to the temperature of the pipe member. The operable lifespan of the underwater pipeline may be as long as 20 years. During this time the pipeline experiences elevated pressures depending on the depth to which it is laid. This increases the risk for hydrolysis, leading to the decay of the polyurethane and exposing the pipe wall. The onset of hydrolysis for polyurethane occurs at a temperature of around 85 degrees Celsius. Therefore if polyurethane is used as a joint coating, it is imperative that it is bonded securely with the pipe coating.

SUMMARY OF THE INVENTION

The pipeline unit according the invention comprises a pipe member and a pipe coating surrounding the pipe member, which pipe member comprises a pipe end, and which pipe coating extends along a length of the pipe member and ends at a coating end face located at a distance from the pipe end, wherein a bonding member is provided on the coating end face, which bonding member is attached to the coating end face and made from a material which is different from the material of which the pipe coating is made.

The invention is base on the insight that if, in the field, it is practically not possible (such as too difficult, too inefficient, or too dangerous) to obtain a secure bond between a preferred material for the joint coating and the material of the pipe coating, a bonding member made of a different material than the pipe coating material should be provided on the coating end face of pipe coating before the pipeline units are joined.

This way, the joint coating will bond with the material of the bond member in stead of the material of the pipe coating.

The conditions under which the bond member is attached to the pipe coating can be set to obtain a sufficient strong bonding between the bonding member and the pipe coating. For example in an factory environment there is sufficient time to achieve the required bonding can be taken, a required temperature can be reached, specific dedicated machines can be used or toxic chemicals (such as specific adhesion promoters) can be used.

In the field, such as on a quay or on a vessel, it is in general not possible to create these conditions. Especially on a pipeline laying vessel there are very little possibilities to create the required conditions. On a pipeline laying vessel, the available operating space is very limited and operations must therefore be performed while use as little space as possible (a small footprint) and as time efficient as possible as the daily costs of operating such a vessel are very high. It is therefore for example not possible to take much time to achieve a strong bonding between materials, use large dedicated machines, or to create a (chemically) controlled environment in which a strong bonding can be achieved.

In an embodiment of the pipeline unit, the material of the pipe coating comprises a polyolefin.

In an embodiment of the pipeline unit, the material of the pipe coating comprises a thermoplastic polyolefin.

In an embodiment of the pipeline unit, the material of the pipe coating comprises a polyolefin elastomer.

In an embodiment of the pipeline unit, the material of the pipe coating comprises polypropylene.

In an embodiment of the pipeline unit, the material of the pipe coating comprises polyethylene.

In an embodiment of the pipeline unit, the material of the pipe coating comprises polystyrene.

In an embodiment of the pipeline unit, the material of the pipe coating comprises polymethylpentene.

In an embodiment of the pipeline unit, the pipe coating is made from a polyolefin material.

In an embodiment of the pipeline unit, the pipe coating is made from a thermoplastic polyolefin material.

In an embodiment of the pipeline unit, the pipe coating is made from a polyolefin elastomeric material.

In an embodiment of the pipeline unit, the pipe coating is made from a polypropylene material.

In an embodiment of the pipeline unit, the pipe coating is made from a polyethylene material.

In an embodiment of the pipeline unit, the pipe coating is made from a polystyrene material.

In an embodiment of the pipeline unit, the pipe coating is made from a polymethylpentene material.

In an embodiment of the pipeline unit, the material of the bonding member comprises polyurethane.

In an embodiment of the pipeline unit, the material of the bonding member comprises silicone.

In an embodiment of the pipeline unit, the material of the bonding member comprises polyamide.

In an embodiment of the pipeline unit, the bonding member is made from a polyurethane material.

In an embodiment of the pipeline unit, the bonding member is made from a silicone material.

In an embodiment of the pipeline unit, the bonding member is made from a polyamide material.

When the pipe coating of the pipeline unit is for example made from a polyolefin material, such as polypropylene, and it is preferred to provide an assembly of two joined pipeline units with a joint coating made from a polyurethane material, the bonding members can be made from a polyurethane material. Due the bonding members made from a polyurethane material which are provided on the coating end face, the joint coating produced by IMPU will bond with the polyurethane material of the bonding members in stead of the polyolefin material of the coating end faces.

The bond strength that can be achieved between IMPU and a polyurethane material is higher than the maximum bond strength that can be achieved between IMPU and a polyolefin material. This means that with the pipeline units comprising the bonding member, a joint coating made from a polyurethane material which is securely bonded with the pipe coating can be obtained.

An advantage of using IMPU for the joint coating, is that the curing time required before mechanical loading can be applied is far less when compared with IMPP. When a joint coating is placed, it has to harden sufficiently so that it can be processed further, such as rolling over rolling boxes and/or bending during a reeling operation. On site, the time taken between joint coatings is referred to as the 'cycle time'. The use of IMPU makes it possible to reduce the cycle time. Reducing the cycle time is highly desired to reduce operation costs, especially off-shore where vessel running costs are very high.

Another advantage of using a polyurethane material for the joint coating, is the low viscosities of the component chemicals prior to mixing. This allows them to be stored at a remote location, thus saving valuable space at the location where the operations takes place, for example the deck of a pipeline laying vessel.

In the field, it is not possible to obtain a secure bonding between a joint coating produced by IMPU and the pipe coating made from a polyolefin material, such as polypropylene. To obtain a secure bonding between a polyurethane material and a polyolefin material, specific adhesion promoters are required to promote bonding between the two materials. The required adhesion promoters can only be used in a chemically controlled environment, as the used adhesion promoters are often highly toxic or dangerous to use for other reasons. It is therefore practically not possible to use these adhesion promoters in the field and especially not off-shore, such as on a pipeline laying vessel.

By producing the pipeline units in a chemically controlled environment, and allowing sufficient time for the bonding process, a secure bonding between the polyurethane bonding member and the polyolefin material of the pipe coating can be obtained. The joint coating made from a polyurethane material can be produced in the field, such as off-shore (for example on a pipeline laying vessel), because for obtaining a secure bond between the joint coating and the polyurethane material of the bonding member, a chemically controlled environment is not required.

The bonding member may be made from a material which is different from the material of the joint coating, as long as, in the field, a better bonding is practically obtainable between the materials of the joint coating and the bonding member, than between the materials of the joint coating and the pipe coating.

The invention further relates to an assembly of two pipeline units according to the invention, wherein;

the pipe ends of the pipeline units are joined together at a pipe joint, such that the bonding members of the pipeline units are located at opposite sides of the pipe joint, a joint coating is provided at the pipe joint, the joint coating surrounds the pipe joint, is attached to the two opposite bonding members of the pipeline units and is made from a material which is different from the material of which the pipe coating is made.

In an embodiment of the assembly, the joint coating is made from the same material as the material of which the bonding member is made.

In an embodiment of the assembly, the joint coating is made from a material which is different from the material of which the bonding member is made.

In an embodiment of the assembly, the material of which the joint coating is made bonds better with the material of the bonding member than with the material of the pipe coating.

In an embodiment of the assembly, the material of which the joint coating is made has better bonding characteristics with the material of the bonding member than with the material of the pipe coating.

In an embodiment of the assembly, the material of the joint coating comprises polyurethane.

In an embodiment of the assembly, the material of the joint coating comprises silicone.

In an embodiment of the assembly, the material of the joint coating comprises polyamide.

In an embodiment of the assembly, the joint coating is made from a polyurethane material.

In an embodiment of the assembly, the joint coating is made from a silicone material.

In an embodiment of the assembly, the joint coating is made from a polyamide material.

The invention further relates to a method of producing an assembly of two pipeline units, the method comprising the steps of:

providing two pipeline units according to the invention, joining the pipe ends of the pipeline units together at a pipe joint, such that the bonding members of the pipeline units are located at opposite sides of the pipe joint, providing a joint coating made from a material which is different from the material of which the pipe coating is made, such that the joint coating surrounds the pipe members and is attached to the two opposite bonding members of the pipeline units.

In an embodiment of the method, the method comprises making the joint coating from the same material as the material of which the bonding member is made.

In an embodiment of the method, the method comprises making the joint coating from a material which is different from the material of which the bonding member is made.

In an embodiment of the method, the method comprises making the joint coating from a material that bonds better with the material of the bonding member than with the material of the pipe coating.

In an embodiment of the method, the method comprises making the joint coating from a material that has better bonding characteristics with the material of the bonding member than with the material of the pipe coating.

In an embodiment of the method, the method comprises making the joint coating from a material comprising polyurethane.

In an embodiment of the method, the method comprises making the joint coating from a material comprising silicone.

In an embodiment of the method, the method comprises making the joint coating from a material comprising polyamide.

In an embodiment of the method, the method comprises making the joint coating from a polyurethane material.

In an embodiment of the method, the method comprises making the joint coating from a silicone material.

In an embodiment of the method, the method comprises making the joint coating from a polyamide material.

The invention further relates to the use of a pipeline unit according to the invention.

The invention further relates to the use of an assembly according to the invention.

Figure 2:
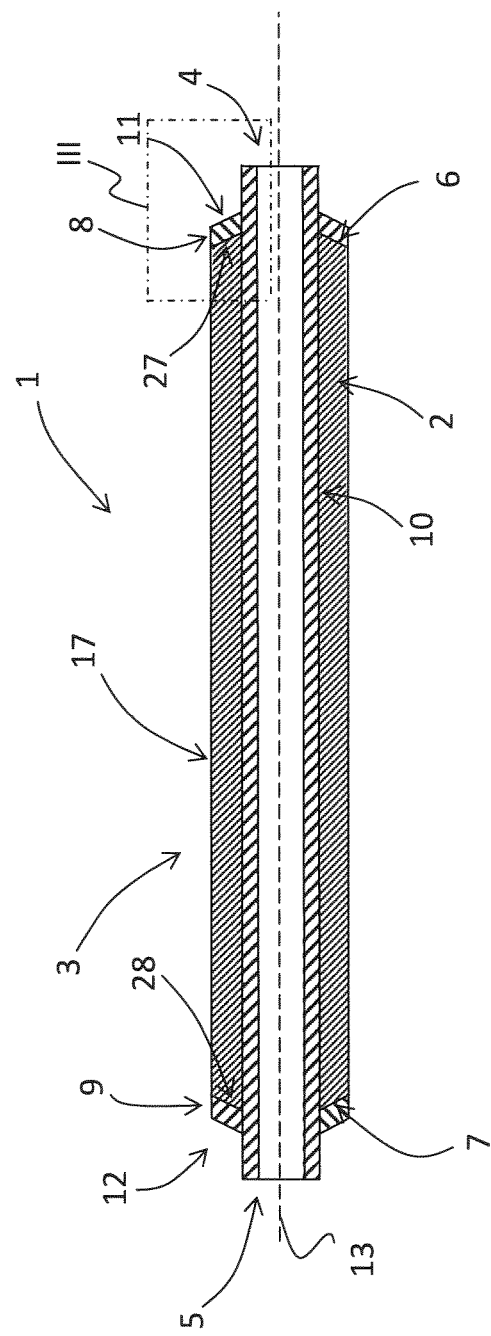
Figure 3:
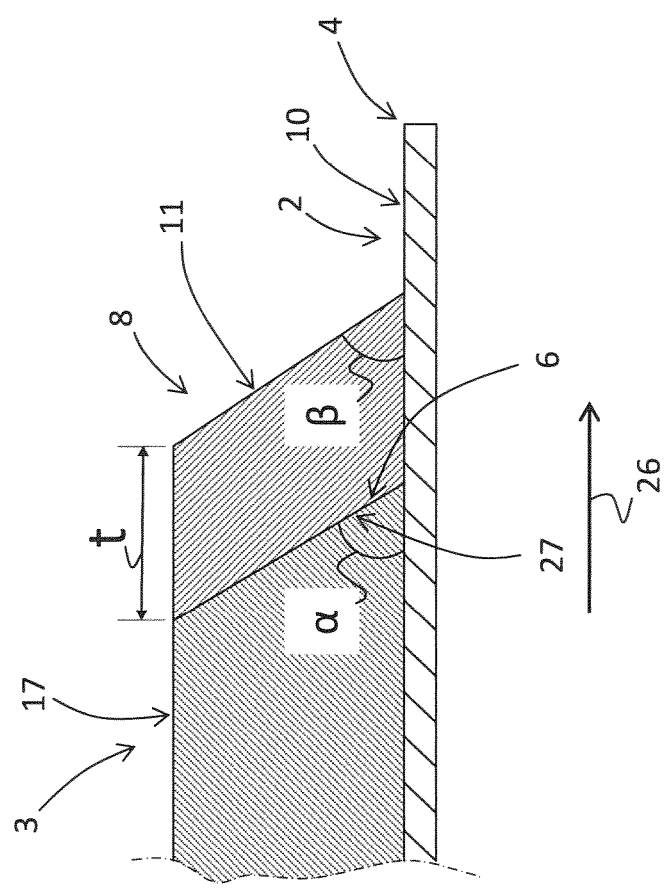
Figure 5:
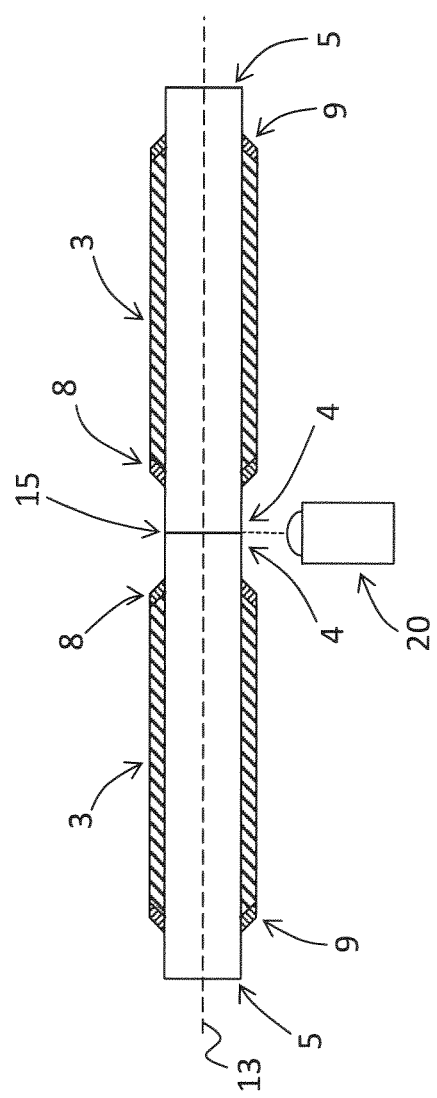
Figure 6:
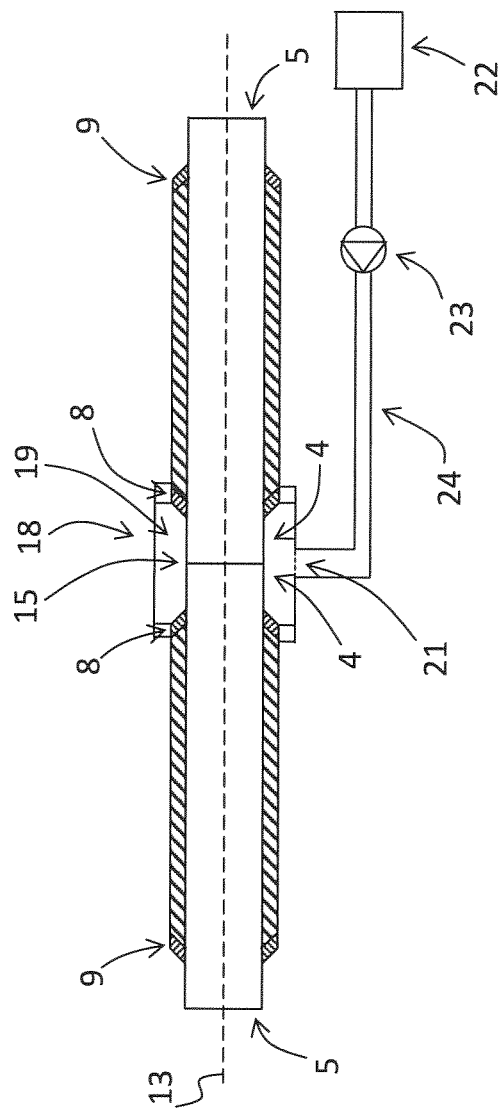
Figure 7:
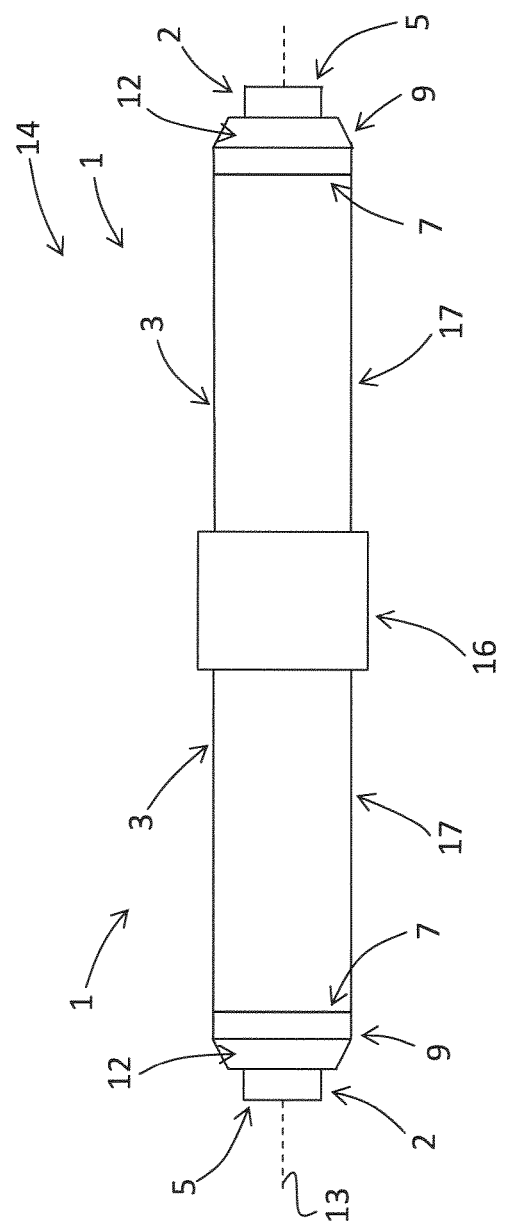
Figure 8:
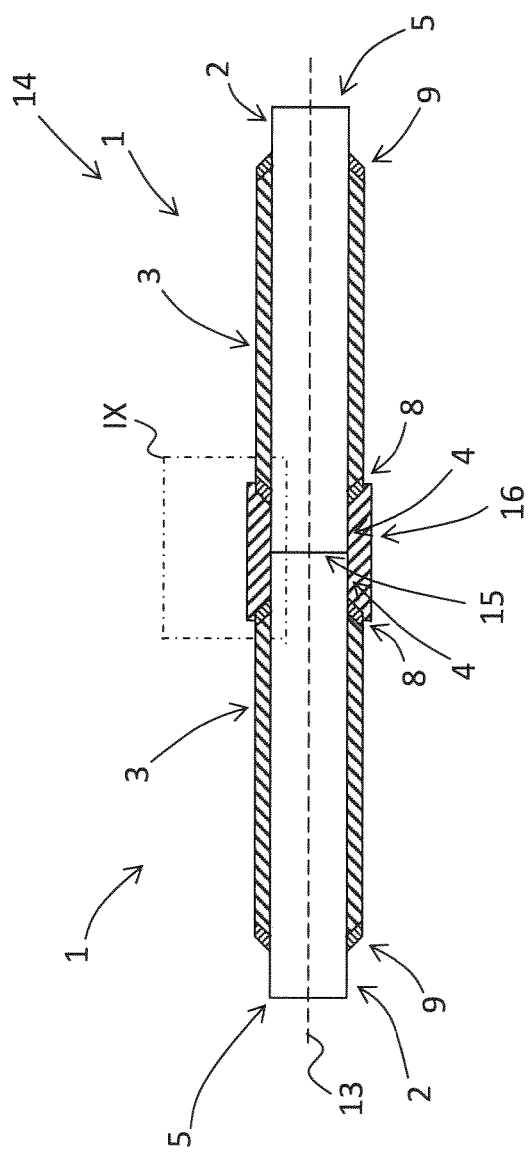
Figure 9:
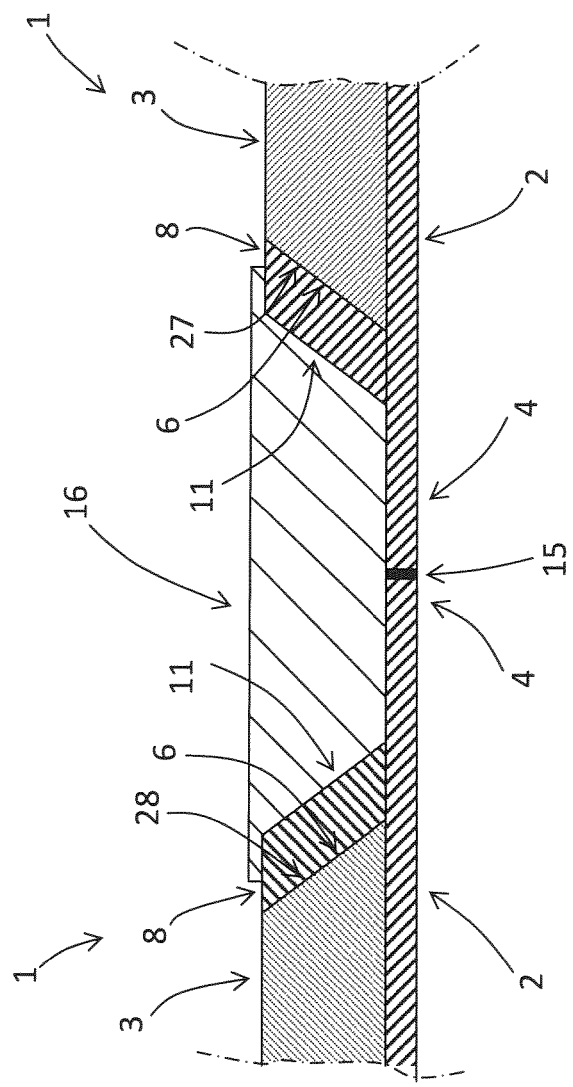
Figure 10:
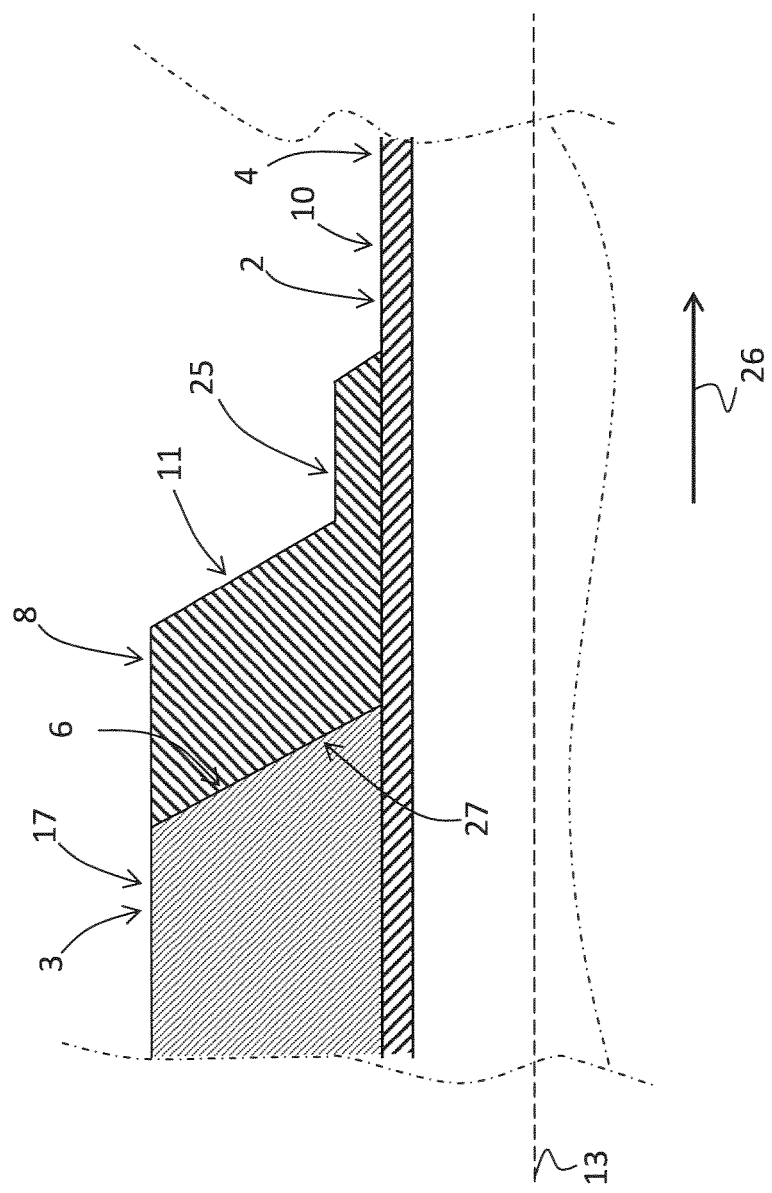

Embodiments of the pipeline unit, the assembly and method according the invention will be described by way of example only, with reference to the accompanying schematic drawings in which corresponding reference symbols indicate corresponding parts, and in which:

FIG. 1 schematically shows a side view of an embodiment of the pipeline unit according to the invention, FIG. 2 schematically shows a cross sectional view of the pipeline unit of FIG. 1, FIG. 3 schematically shows an enlarged view of part III of FIG. 2, FIGS. 4-6 schematically show an embodiment of the method of producing an assembly of two pipeline units as shown in FIG. 1, FIG. 7 schematically shows a side view of the assembly of two pipeline unit as produced by the method shown in the FIG. 4-6, FIG. 8 schematically shows a cross sectional view of the assembly of FIG. 7, FIG. 9 schematically shows an enlarged view of part IX of FIG. 8, FIG. 10 schematically shows a cross sectional view of a further embodiment of the pipeline unit according to the invention.

DETAILED DESCRIPTION OF THE INVENTION

FIG. 1 shows a side view of an embodiment of the pipeline unit according to the invention. The pipeline unit 1 comprising a pipe member 2 and a pipe coating 3 surrounding the pipe member 2. The pipe member 2 comprises a first pipe end 4 and a second pipe end 5. The pipe coating 3 extends along a length of the pipe member 2 and ends at a first coating end face 6 located at a distance from the first pipe end 4 and at a second coating end face 7 located at a distance from the second pipe end 5. The pipe coating 3 extends along the pipe member 2 from the first coating end face 6 to the second coating end face 7.

The pipe coating 3 is made from a polyolefin material. A first bonding member 8 made from a polyurethane material is provided on and attached to the first coating end face 6. A second bonding member 9 made from a polyurethane material is provided on and attached to the second coating end face 7. The first bonding member 8 is located at a distance from the first pipe end 4. The second bonding member 9 is located at a distance from the second pipe end 5.

The first and second bonding members 8, 9 made of a polyurethane material are provided on the polyolefin material of the first and second coating end faces 6, 7, respectively, in a factory environment. The first bonding member 8 is securely bonded to the 25 first coating end face 6. The second bonding member 9 is securely bonded to the second coating end face 7. The first bonding member 8 has a water impermeable bond with the first coating end face 6. The second bonding member 9 has a water impermeable bond with the second coating end face 7.

FIG. 2 shows a cross sectional view of the pipeline unit of FIG. 1 and FIG. 3 shows an enlarged view of part III of FIG. 2. The cross section of the FIGS. 2 and 3 is along the longitudinal pipe axis 13 of the pipeline unit 1.

The pipe member 2 comprises an outer pipe surface 10. The first and second coating end faces 7, 8 surround the pipe member 2 and extends transverse to the outer pipe surface 10. The first bonding member 8 is attached to the pipe coating 3 at a first member bond 27 and the second bonding member 9 is attached to the pipe coating 3 at a second member bond 28.

The first bonding member 8 forms a first bonding face 11 surrounding the pipe member 2 and extending transverse to the outer pipe surface 10. The second bonding member 9 forms a second bonding face 12 surrounding the pipe member 2 and extending transverse to the outer pipe surface 10. The first and second bonding members 11, 12 fully cover the first and second coating end face 6, 7, respectively.

The pipe coating 3 is made from a polypropylene material. In other embodiments of the pipeline unit 1, the pipe coating 3 is made from a different material, these can be a polyolefin material, such as a polyethylene (PE) material or a polymethylpentene material (PMP), or a material comprising one or more polyolefin materials, such as a composite material comprising polypropylene and rubber, or a different material, such as a material comprising silicone.

The pipe member 2 defines a longitudinal pipe axis 13. The thickness (t) of the bonding members 8, 9, in the direction of the longitudinal pipe axis 13, is around 250 mm. The direction of the longitudinal pipe axis 13 is indicated by arrow 26. In other examples, the thickness (t) is be between 5 mm and 2500 mm. In other examples, the thickness (t) is be between 100 mm and 1000 mm.

The pipe coating 3 comprises an outer coating surface 17. The first and second coating end faces 6, 7 extend between the outer pipe surface 10 and the outer coating surface 17 at an angle (a) between 20 and 50 degrees from the longitudinal pipe axis 13. In other examples, the first and second coating end faces 6, 7 extend between the outer pipe surface 10 and the outer coating surface 17 at an angle ($\alpha$) between 10 and 90 degrees from the longitudinal pipe axis 13. In other examples, the first and second coating end faces 6, 7 extend between the outer pipe surface 10 and the outer coating surface 17 at an angle ($\alpha$) between 0 and 90 degrees from the longitudinal pipe axis 13. In other examples, the first and second coating end faces 6, 7 extend between the outer pipe surface 10 and the outer coating surface 17 at an angle ($\alpha$) which varies. In said situation the first and second coating end faces 6, 7 may have for example a curved form or a stair-like form. The angle ($\alpha$) may vary between the indicated ranges.

The first and second bonding faces 11, 12 extends between the outer pipe surface 10 and the outer coating surface 17 at an angle ($\beta$) between 20 and 50 degrees from the longitudinal pipe axis 13. In other examples, the first and second bonding faces 11, 12 extends between the outer pipe surface 10 and the outer coating surface 17 at an angle ($\beta$) between 10 and 90 degrees from the longitudinal pipe axis 13. In other examples, the first and second bonding faces 11, 12 extends between the outer pipe surface 10 and the outer coating surface 17 at an angle ($\beta$) between 0 and 90 degrees from the longitudinal pipe axis 13. In other examples, the first and second bonding faces 11, 12 extends between the outer pipe surface 10 and the outer coating surface 17 at an angle ($\beta$) which varies. In said situation the first and second bonding faces 11, 12 may for example have a curved form or a stair-like form. The angle ($\beta$) may vary between the indicated ranges.

Figure 4:
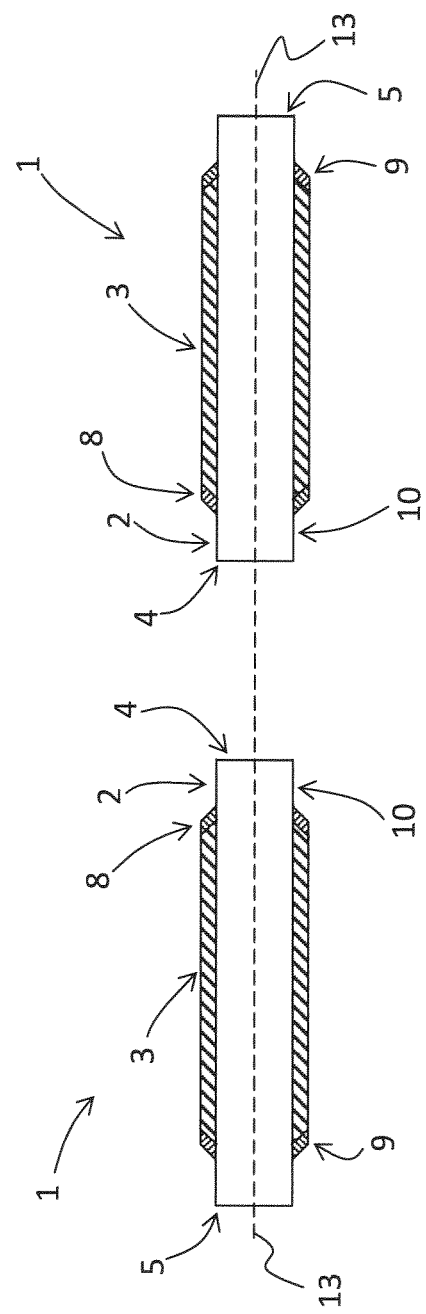

The FIGS. 4-6 shows an embodiment of the method of producing an assembly of two pipeline units as shown in FIG. 1.

In FIG. 4, two pipeline units 1 as shown in FIG. 1 are provided. The pipeline units 1 are shown in a cross sectional view along the longitudinal pipe axis 13. The pipeline units 1 are aligned.

In FIG. 5, the first pipe ends 4 of the pipeline units 1 are joined together at a pipe joint 15, such that the first bonding members 8 of the pipeline units 1 are located at opposite sides of the pipe joint 15. The pipeline units 1 are joined by a welding device 20. In other examples, a different type of joining technique is used.

In FIG. 6, a joint coating 16 made from a polyurethane material is provided at the pipe joint 15, such that the joint coating 16 surrounds the pipe members 2 and is connected to the two opposite first bonding members 8 of the pipeline units 1. The joint coating 16 is produced by injection moulding of polyurethane (IMPU). A mould 18 is placed around the pipe joint 15 and in contact with the pipe coating 3 and/or the first bonding members 8. The pipe joint 15 is enclosed by the mould 18 that defines a cavity 19 between the uncoated first pipe ends 4 and the pipe joint 15, the two opposite first bounding faces 11 and the mould 18. Pre-set polyurethane is then injected via an inlet 21 provided in the mould 18 into the cavity 19 where it subsequently cools and solidifies.

A pump 23 is used to pump the polyurethane material from an IMPU supply 22 via supply channel 24 connected with the inlet 21 into the cavity 19 of the mould 18. A layer of an anti corrosion agent may be provided on the first pipe ends 4 and the pipe joint 15 before 25 the joint coating 16 is applied.

The joining of the pipeline units 1 and the placing the joint coating 16 is performed in an environment which is not chemically controlled. Said operations are performed in the field, such as on a quay or off-shore, as for example on a pipeline laying vessel.

The FIGS. 7-9 show the assembly of two pipeline unit as produced by the method shown in the FIG. 4-6.

The assembly 14 comprises two pipeline units 1 as shown in FIG. 1. The first pipe ends 4 of the pipeline units 1 are joined together at a pipe joint 15, such that the first bonding members 8 of the pipeline units 1 are located at opposite sides of the pipe joint 15. A joint coating 16 is provided at the pipe joint 15. The joint coating 16 is made from a polyurethane material, surrounds the pipe joint 15, and is connected to the two opposite first bonding members 8 of the pipeline units 1.

The joint coating 16 is connected to the two opposite first bonding faces 11 of the pipeline units 1. The joint coating 16 extends over the full distance between the two opposite first bonding members 8 of the pipeline units 1.

FIG. 10 shows a cross sectional view of a further embodiment of the pipeline unit according to the invention. The bonding member 8 comprises an extended inner part 25 configured to increase the contact area with which the bonding member 8 is (directly or indirectly) connected to the pipe member 2. In one aspect, this tends to achieve a better fixation of the bonding member 8 to the pipe member 2. The extended inner part 25 surrounds the pipe member 2.

It will be apparent to those skilled in the art that various modifications can be made to the pipeline unit, assembly and method without departing from the scope of the invention.

The following clauses provide a further description of the pipeline unit according to the invention, the assembly according to the invention, the method according to the invention, and the use of the pipeline unit and the assembly according to the invention.

1. Pipeline unit comprising a pipe member and a pipe coating surrounding the pipe member, which pipe member comprises a pipe end, and which pipe coating extends along a length of the pipe member and ends at a coating end face located at a distance from the pipe end, wherein a bonding member is provided on the coating end face, which bonding member is attached to the coating end face and made from a material which is different from the material of which the pipe coating is made.
2. Pipeline unit according to clause 1, wherein the material of the pipe coating comprises a polyolefin.

3. Pipeline unit according to clause 1 or 2, wherein the material of the pipe coating comprises a thermoplastic polyolefin.
4. Pipeline unit according to any of the preceding clauses, wherein the material of the pipe coating comprises a polyolefin elastomer.
5. Pipeline unit according to any of the preceding clauses, wherein the material of the pipe coating comprises polypropylene.
6. Pipeline unit according to any of the preceding clauses, wherein the material of the pipe coating comprises polyethylene.
7. Pipeline unit according to any of the preceding clauses, wherein the material of the pipe coating comprises polystyrene.
8. Pipeline unit according to any of the preceding clauses, wherein the material of the pipe coating comprises polymethylpentene.
9. Pipeline unit according to clause 1, wherein the pipe coating is made from a polyolefin material.
10. Pipeline unit according to clause 1, wherein the pipe coating is made from a thermoplastic polyolefin material.
11. Pipeline unit according to clause 1, wherein the pipe coating is made from a polyolefin elastomeric material.
12. Pipeline unit according to clause 1, wherein the pipe coating is made from a polypropylene material.
13. Pipeline unit according to clause 1, wherein the pipe coating is made from a polyethylene material.
14. Pipeline unit according to clause 1, wherein the pipe coating is made from a polystyrene material.
15. Pipeline unit according to clause 1, wherein the pipe coating is made from a polymethylpentene material.
16. Pipeline unit according to any of the preceding clauses, wherein the material of the bonding member comprises polyurethane.
17. Pipeline unit according to any of the preceding clauses, wherein the material of the bonding member comprises silicone.
18. Pipeline unit according to any of the preceding clauses, wherein the material of the bonding member comprises polyamide.
19. Pipeline unit according to any of the clauses 1-15, wherein the bonding member is made from a polyurethane material.
20. Pipeline unit according to any of the clauses 1-15, wherein the bonding member is made from a silicone material.
21. Pipeline unit according to any of the clauses 1-15, wherein the bonding member is made from a polyamide material.
22. Pipeline unit according to any of the preceding clauses, wherein the pipe coating and the bonding member are bonded at a member bond.
23. Pipeline unit according to clause 22, wherein the member bond withholds a normal strain of up to 10%.
24. Pipeline unit according to clause 22, wherein the member bond withholds a normal strain between 1% -5%.
25. Pipeline unit according to clause 22, wherein the member bond withholds a normal strain of around 2%.
26. Pipeline unit according to any of the clauses 22-25, wherein the strength of the member bond is between 25% and 100% of the maximal bond strength obtainable between the material of the pipe coating and the material of the bonding member.
27. Pipeline unit according to any of the clauses 22-25, wherein the strength of the member bond is around 50% of the maximal bond strength obtainable between the material of the pipe coating and the material of the bonding member.
28. Pipeline unit according to any of the preceding clauses, wherein the pipe coating and the bonding member are bonded under conditions which are substantially optimal to reach the maximal bond strength obtainable between the material of the pipe coating and the material of the bonding member.
29. Pipeline unit according to any of the clauses 1-27, wherein the pipe coating and the bonding member are bonded under conditions which are optimal to reach the maximal bond strength obtainable between the material of the pipe coating and the material of the bonding member.
30. Pipeline unit according to any of the preceding clauses, wherein the pipe coating and the bonding member are bonded in a factory environment.
31. Pipeline unit according to any of the preceding clauses, wherein the pipe coating and the bonding member are bonded in temperature controlled environment.
32. Pipeline unit according to any of the preceding clauses, wherein the pipe coating and the bonding member are allowed to bond for at least 24 hours before subjecting to a normal strain of at least 1%.
33. Pipeline unit according to any of the preceding clauses, wherein the pipe coating and the bonding member are bonded in a chemically controlled environment.
34. Pipeline unit according to any of the preceding clauses, wherein the bonding member is located at a distance from the pipe end.
35. Pipeline unit according to any of the preceding clauses, wherein the bonding member forms a bonding face located a distance from the pipe end.
36. Pipeline unit according to any of the preceding clauses, wherein the pipe member comprises an outer pipe surface.
37. Pipeline unit according to clause 36, wherein the coating end face surrounds the pipe member and extends transverse to the outer pipe surface.
38. Pipeline unit according to clause 36 or 37, wherein the bonding face surrounding the pipe member and extending transverse to the outer pipe surface.
39. Pipeline unit according to any of the preceding clauses, wherein the bonding member fully covers the coating end face.
40. Pipeline unit according to any of the preceding clauses, wherein the pipe member defines a longitudinal pipe axis.
41. Pipeline unit according to clause 40, wherein the thickness of the bonding member, in the direction of the longitudinal pipe axis, is between 5 mm and 2500 mm.
42. Pipeline unit according to clause 40, wherein the thickness of the bonding member, in the direction of the longitudinal pipe axis, is between 100 mm and 1000 mm.
43. Pipeline unit according to any of the preceding clauses, wherein the pipe coating comprises an outer coating surface.
44. Pipeline unit according to clause 43, wherein the coating end face extends between the outer pipe surface and the outer coating surface at an angle between 0 and 90 degrees from the longitudinal pipe axis.
45. Pipeline unit according to clause 43, wherein the coating end face extends between the outer pipe surface and the outer coating surface at an angle between 10 and 90 degrees from the longitudinal pipe axis.
46. Pipeline unit according to clause 43, wherein the coating end face extends between the outer pipe surface and the outer coating surface at an angle between 20 and 50 degrees from the longitudinal pipe axis.
47. Pipeline unit according to any of the clauses 44-46, wherein the angle of the coating end face varies.
48. Pipeline unit according to any of the clauses 43-47, wherein the bonding face extends between the outer pipe surface and the outer coating surface at an angle between 0 and 90 degrees from the longitudinal pipe axis.

49. Pipeline unit according to any of the clauses 43-47, wherein the bonding face extends between the outer pipe surface and the outer coating surface at an angle between 10 and 90 degrees from the longitudinal pipe axis.

50. Pipeline unit according to any of the clauses 43-47, wherein the bonding face extends between the outer pipe surface and the outer coating surface at an angle between 20 and 50 degrees from the longitudinal pipe axis.

51. Pipeline unit according to any of the clauses 48-50, wherein the angle of the bonding face varies.

52. Pipeline unit according to any of the preceding clauses, wherein the bonding member comprises an extended inner part configured to increase the contact area with which to the bonding member is connected to the pipe member.

53. Pipeline unit according to clause 52, wherein the extended inner part surrounds the pipe member.

54. Pipeline unit according to any of the preceding clauses, wherein the pipe member comprises a further pipe end and the pipe coating ends at a further coating end face located at a distance from the further pipe end, wherein a further bonding member is provided on the further coating end face, which further bonding member is attached to the further coating end face and made from a material which is different from the material of which the pipe coating is made.

55. Pipeline unit according to clause 54, wherein the further bonding member is made from the same material as the bonding member.

56. Pipeline unit according to clause 54-55, wherein the further bonding member comprises the same features as the bonding member.

57. Assembly of two pipeline units according to any of the preceding clauses, wherein;
    the pipe ends of the pipeline units are joined together at a pipe joint, such that the bonding members of the pipeline units are located at opposite sides of the pipe joint,
    a joint coating is provided at the pipe joint,
    the joint coating surrounds the pipe joint, is attached to the two opposite bonding members of the pipeline units and is made from a material which is different from the material of which the pipe coating is made.

58. Assembly according to clause 57, wherein the joint coating is made from the same material as the material of which the bonding member is made.

59. Assembly according to clause 57, wherein the joint coating is made from a material which is different from the material of which the bonding member is made.

60. Assembly according to any of the clauses 57-59, wherein the material of which the joint coating is made bonds better with the material of the bonding member than with the material of the pipe coating.

61. Assembly according to any of the clauses 57-59, wherein outside a factory environment, the material of which the joint coating is made bonds better with the material of the bonding member than with the material of the pipe coating.

62. Assembly according to any of the clauses 57-59, wherein in the field, such as on a quay or off-shore, the material of which the joint coating is made bonds better with the material of the bonding member than with the material of the pipe coating.

63. Assembly according to any of the clauses 57-59, wherein on a pipeline laying vessel, the material of which the joint coating is made bonds better with the material of the bonding member than with the material of the pipe coating.

64. Assembly according to any of the clauses 57-59, wherein outside a chemically controlled environment, the material of which the joint coating is made bonds better with the material of the bonding member than with the material of the pipe coating.

65. Assembly according to any of the clauses 60-64, wherein the better bonding relates to a faster bonding of the material of the joint coating with the material of the bonding member when compared with bonding the material of the joint coating with the material of the pipe coating.

66. Assembly according to any of the clauses 60-64, wherein the better bonding relate to faster reaching a bonding of the material of the joint coating with the material of the bonding member which withholds a normal strain of up to 10% when compared with the time required to achieve a bonding of the material of the joint coating with the material of the pipe coating which withholds said normal strain.

67. Assembly according to any of the clauses 60-64, wherein the better bonding relate to faster reaching a bonding of the material of the joint coating with the material of the bonding member which withholds a normal strain of between 1% and 5% when compared with the time required to achieve a bonding of the material of the joint coating with the material of the pipe coating which withholds said normal strain.

68. Assembly according to any of the clauses 60-64, wherein the better bonding relate to faster reaching a bonding of the material of the joint coating with the material of the bonding member which withholds a normal strain of around 2% when compared with the time required to achieve a bonding of the material of the joint coating with the material of the pipe coating which withholds said normal strain.

69. Assembly according to any of the clauses 57-59, wherein the material of which the joint coating is made has better bonding characteristics with the material of the bonding member than with the material of the pipe coating.

70. Assembly according to any of the clauses 57-59, wherein outside a factory environment, the material of which the joint coating is made has better bonding characteristics with the material of the bonding member than with the material of the pipe coating.

71. Assembly according to any of the clauses 57-59, wherein in the field, such as on a quay or off-shore, the material of which the joint coating is made has better bonding characteristics with the material of the bonding member than with the material of the pipe coating.

72. Assembly according to any of the clauses 57-59, wherein on a pipeline laying vessel, the material of which the joint coating is made has better bonding characteristics with the material of the bonding member than with the material of the pipe coating.

73. Assembly according to any of the clauses 57-59, wherein outside a chemically controlled environment, the material of which the joint coating is made has better bonding characteristics with the material of the bonding member than with the material of the pipe coating.

74. Assembly according to any of the clauses 69-73, wherein the better bonding characteristics relate to a faster bonding of the material of the joint coating with the material of the bonding member when compared with bonding the material of the joint coating with the material of the pipe coating.

75. Assembly according to any of the clauses 69-73, wherein the better bonding characteristics relate to faster reaching a bonding of the material of the joint coating with the material of the bonding member which withholds a normal strain of up to 10% when compared with the time required to achieve a bonding of the material of the joint coating with the material of the pipe coating which withholds said normal strain.

76. Assembly according to any of the clauses 69-73, wherein the better bonding characteristics relate to faster reaching a bonding of the material of the joint coating with the material of the bonding member which withholds a normal strain of between 1% and 5% when compared with the time required to achieve a bonding of the material of the joint coating with the material of the pipe coating which withholds said normal strain.

77. Assembly according to any of the clauses 69-73, wherein the better bonding characteristics relate to faster reaching a bonding of the material of the joint coating with the material of the bonding member which withholds a normal strain of around 2% when compared with the time required to achieve a bonding of the material of the joint coating with the material of the pipe coating which withholds said normal strain.

78. Assembly according to any of the clauses 57-77, wherein the material of the joint coating comprises polyurethane.

79. Assembly according to any of the clauses 57-78, wherein the material of the joint coating comprises silicone.

80. Assembly according to any of the clauses 57-79, wherein the material of the joint coating comprises polyamide.

81. Assembly according to any of the clauses 57-77, wherein the joint coating is made from a polyurethane material.

82. Assembly according to any of the clauses 57-77, wherein the joint coating is made from a silicone material.

83. Assembly according to any of the clauses 57-77, wherein the joint coating is made from a polyamide material.

84. Assembly according to any of the clauses 57-83, wherein the joint coating is attached to the two opposite bonding faces of the pipeline units.

85. Assembly according to any of the clauses 57-84, wherein the joint coating is provided by an injection moulding process.

86. Assembly according to any of the clauses 57-85, wherein the joint coating extends over the full distance between the two opposite bonding members.

87. Method of producing an assembly of two pipeline units, the method comprising the steps of:
providing two pipeline units according to any of the clauses 1-56,
joining the pipe ends of the pipeline units together at a pipe joint, such that the bonding members of the pipeline units are located at opposite sides of the pipe joint,
providing a joint coating made from a material which is different from the material of which the pipe coating is made, such that the joint coating surrounds the pipe members and is attached to the two opposite bonding members of the pipeline units.

88. Method according to clause 87, wherein the method comprises making the joint coating from the same material as the material of which the bonding member is made.

89. Method according to clause 87, wherein the method comprises making the joint coating from a material which is different from the material of which the bonding member is made.

90. Method according to any of the clauses 87-89, wherein the method comprises making the joint coating from a material that bonds better with the material of the bonding member than with the material of the pipe coating.

91. Method according to any of the clauses 87-89, wherein the method comprises making the joint coating from a material that, outside a factory environment, bonds better with the material of the bonding member than with the material of the pipe coating.

92. Method according to any of the clauses 87-89, wherein the method comprises making the joint coating from a material that, in the field, such as on a quay or off-shore, bonds better with the material of the bonding member than with the material of the pipe coating.

93. Method according to any of the clauses 87-89, wherein the method comprises making the joint coating from a material that, on a pipeline laying vessel, bonds better with the material of the bonding member than with the material of the pipe coating.

94. Method according to any of the clauses 87-89, wherein the method comprises making the joint coating from a material that, outside a chemically controlled environment, bonds better with the material of the bonding member than with the material of the pipe coating.

95. Method according to any of the clauses 90-94, wherein the better bonding relates to a faster bonding of the material of the joint coating with the material of the bonding member when compared with bonding the material of the joint coating with the material of the pipe coating.

96. Method according to any of the clauses 90-94, wherein the better bonding relate to faster reaching a bonding of the material of the joint coating with the material of the bonding member which withholds a normal strain of up to 10% when compared with the time required to achieve a bonding of the material of the joint coating with the material of the pipe coating which withholds said normal strain.

97. Method according to any of the clauses 90-94, wherein the better bonding relate to faster reaching a bonding of the material of the joint coating with the material of the bonding member which withholds a normal strain of between 1% and 5% when compared with the time required to achieve a bonding of the material of the joint coating with the material of the pipe coating which withholds said normal strain.

98. Method according to any of the clauses 90-94, wherein the better bonding relate to faster reaching a bonding of the material of the joint coating with the material of the bonding member which withholds a normal strain of around 2% when compared with the time required to achieve a bonding of the material of the joint coating with the material of the pipe coating which withholds said normal strain.

99. Method according to any of the clauses 87-89, wherein the method comprises making the joint coating from a material that has better bonding characteristics with the material of the bonding member than with the material of the pipe coating.

100. Method according to any of the clauses 87-89, wherein the method comprises making the joint coating from a material that, outside a factory environment, has better bonding characteristics with the material of the bonding member than with the material of the pipe coating.

101. Method according to any of the clauses 87-89, wherein the method comprises making the joint coating from a material that, in the field, such as on a quay or off-shore, has better bonding characteristics with the material of the bonding member than with the material of the pipe coating.

102. Method according to any of the clauses 87-89, wherein the method comprises making the joint coating from a material that, on a pipeline laying vessel, has better bonding characteristics with the material of the bonding member than with the material of the pipe coating.

103. Method according to any of the clauses 87-89, wherein the method comprises making the joint coating from a material that, outside a chemically controlled environment, has better bonding characteristics with the material of the bonding member than with the material of the pipe coating.

104. Method according to any of the clauses 99-103, wherein the better bonding characteristics relate to a faster bonding of the material of the joint coating with the material of the bonding member when compared with bonding the material of the joint coating with the material of the pipe coating.

105. Method according to any of the clauses 99-103, wherein the better bonding characteristics relate to faster reaching a bonding of the material of the joint coating with the material of the bonding member which withholds a normal strain of up to 10% when compared with the time required to achieve a bonding of the material of the joint coating with the material of the pipe coating which withholds said normal strain.

106. Method according to any of the clauses 99-103, wherein the better bonding characteristics relate to faster reaching a bonding of the material of the joint coating with the material of the bonding member which withholds a normal strain of between 1% and 5% when compared with the time required to achieve a bonding of the material of the joint coating with the material of the pipe coating which withholds said normal strain.

107. Method according to any of the clauses 99-103, wherein the better bonding characteristics relate to faster reaching a bonding of the material of the joint coating with the material of the bonding member which withholds a normal strain of around 2% when compared with the time required to achieve a bonding of the material of the joint coating with the material of the pipe coating which withholds said normal strain.

108. Method according to any of the clauses 87-107, wherein the method comprises making the joint coating from a material comprising polyurethane.

109. Method according to any of the clauses 87-108, wherein the method comprises making the joint coating from a material comprising silicone.

110. Method according to any of the clauses 87-109, wherein the method comprises making the joint coating from a material comprising polyamide.

111. Method according to any of the clauses 87-107, wherein the method comprises making the joint coating from a polyurethane material.

112. Method according to any of the clauses 87-107, wherein the method comprises making the joint coating from a silicone material.

113. Method according to any of the clauses 87-107, wherein the method comprises making the joint coating from a polyamide material.

114. Method according to any of the clauses 87-113, wherein the joint coating is attached to the two opposite bonding faces.

115. Method according to any of the clauses 87-114, wherein the method comprises providing the joint coating by an injection moulding process.

116. Method according to any of the clauses 87-115, wherein the method comprises providing the joint coating on the joined pipeline units outside a factory environment.

117. Method according to any of the clauses 87-116, wherein the method comprises providing the joint coating on the joined pipeline units in the field, such as on a quay or off-shore.

118. Method according to any of the clauses 87-117, wherein the method comprises providing the joint coating on the joined pipeline units on a pipeline laying vessel.

119. Method according to any of the clauses 87-118, wherein the method comprises providing the joint coating on the joined pipeline units outside a chemically controlled environment.

120. Use of a pipeline unit according to any of the clauses 1-56.

121. Use of an assembly according to any of the clauses 57-86.

The invention claimed is:

1. A pipeline unit comprising a pipe member and a pipe coating surrounding the pipe member, which pipeline unit is not connected to another pipeline unit in a pipeline, which pipe member comprises two identical opposite free pipe ends of bare metal having an exposed end surface, each free pipe end being configured to be butt-welded to a free pipe end of another pipeline unit, wherein the pipe coating extends along a length of the pipe member and ends at a coating end face located at a distance from the pipe ends, such that the pipe ends are free of any coating, wherein separate bonding members are provided on the coating end faces, wherein the bonding members are chemically bonded to the coating end faces and are made from a single bonding material which is different from a coating material of which the pipe coating is made, wherein the separate bonding members are not interconnected and do not cover a central cylindrical outer surface of the pipe coating, which cylindrical outer surface extends between the two opposite coating end faces, the bonding material being only one thermoset material which is polyurethane.

2. The pipeline unit according to claim 1, wherein the pipe coating is made from a polypropylene material.

3. The pipeline unit according to claim 1, wherein the pipe coating and the bonding member are bonded at a member bond.

4. The pipeline unit according to claim 1, wherein the pipe coating and the bonding member are bonded under conditions which are optimal to reach the maximal bond strength obtainable between the material of the pipe coating and the material of the bonding member.

5. An assembly of two pipeline units according to claim 1, wherein:
the pipe ends of the pipeline units are joined together at a pipe joint, such that the bonding members of the pipeline units are located at opposite sides of the pipe joint;
a joint coating is provided at the pipe joint; and
the joint coating surrounds the pipe joint, is attached to the two opposite bonding members of the pipeline units and is made from a material which is different from the material of which the pipe coating is made.

6. The assembly according to claim 5, wherein the joint coating is made from the same material as the material of which the bonding member is made.

7. The assembly according to claim 5, wherein the material of which the joint coating is made bonds better with the material of the bonding member than with the material of the pipe coating.

8. The assembly according to claim 5, wherein outside a factory environment, the material of which the joint coating is made bonds better with the material of the bonding member than with the material of the pipe coating.

9. The assembly according to claim 7, wherein the better bonding relates to a faster bonding of the material of the joint coating with the material of the bonding member when compared with bonding the material of the joint coating with the material of the pipe coating.

10. A method of producing a pipeline comprising at least two pipeline units, the method comprising the steps of:

performing the following steps multiple times in a factory on shore:
  providing a pipe member with identical pipe ends;
  surrounding the pipe member with a coating which extends along a length of the pipe member and ends at a coating end face located at a distance from the pipe ends, the pipe ends being of bare metal and having an exposed end surface;
  providing separate bonding members on the coating end faces, wherein each bonding member is chemically bonded to a coating end face, the bonding members being made from a single thermoset bonding material which is polyurethane, wherein the bonding material is different from the coating material from which the pipe coating is made, wherein the separate bonding members are not interconnected and do not cover a central cylindrical outer surface of the pipe coating, which cylindrical outer surface extends between the two opposite coating end faces, thus creating a pipeline unit; and
  transporting the pipeline unit to a pipeline laying vessel; and
performing the following steps on a pipeline laying vessel:
  joining the end surfaces of the pipe ends of at least two pipeline units together at a pipe joint by butt-welding, such that the bonding members of the pipeline units are located at opposite sides of the pipe joint;
  heating the opposite coating end faces of the joined pipeline units;
  enclosing the pipe joint with a mould that defines a cavity between the uncoated pipe ends and the pipe joint, the two opposite coating end faces of the pipeline units and the mould;
  injecting injection moulded polyurethane into the cavity;
  letting the injection moulded polyurethane cure and bond with the bonding members; and
  removing the mould.

11. The method according to claim 10, wherein the method comprises making the joint coating from a material that bonds better with the material of the bonding member than with the material of the pipe coating.

12. The method according to claim 11, wherein the better bonding relates to a faster bonding of the material of the joint coating with the material of the bonding member when compared with bonding the material of the joint coating with the material of the pipe coating.

13. The method according to claim 10, wherein the method comprises making the joint coating from a material that has better bonding characteristics with the material of the bonding member than with the material of the pipe coating.

14. The pipeline unit according to claim 1, wherein each bonding member defines an attachment surface to which a polyurethane field joint coating attaches during a subsequent pipe joining operation, and wherein said attachment surface is uncovered in order to ensure a proper bonding to the polyurethane field joint coating.

* * * * *